Oct. 30, 1951  E. A. ROCKWELL  2,573,277
POWER INTENSIFIER
Filed March 30, 1944
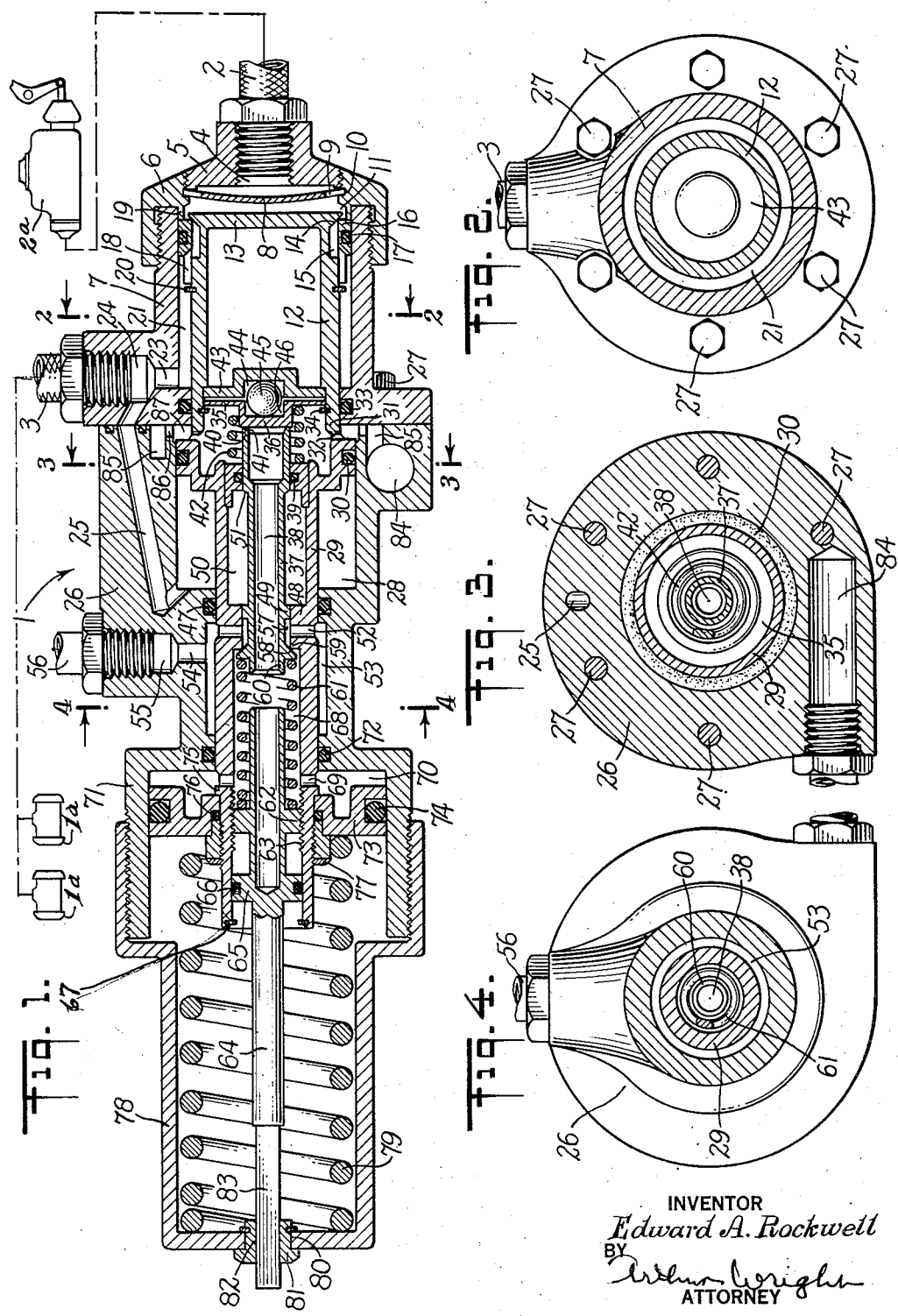
INVENTOR
*Edward A. Rockwell*
BY
*Arthur Wright*
ATTORNEY Patented Oct. 30, 1951

2,573,277

UNITED STATES PATENT OFFICE 2,573,277

POWER INTENSIFIER

Edward A. Rockwell, Cleveland, Ohio

Application March 30, 1944, Serial No. 528,803

16 Claims. (Cl. 60—54.6)

My invention relates particularly to a power intensifier mechanism designed for use in any pressure line in which it is designed to increase the pressure of the fluid in said line by the application of a source of high pressure thereto, although my invention is capable of application especially for the operation of brakes on automotive vehicles, such as automobiles, airplanes, etc.

The object of my invention is to provide a power mechanism with which the pressures in any pressure fluid line may be increased by the application of another high pressure thereto. A further object is to provide a mechanism of this character in which hydraulic pressures may be increased by applying thereto a source of a high pressure which may be, for example, compressed air or a hydraulic liquid. A further object is to arrange the parts of such mechanism so as to be capable of manual adjustment. Another object is to provide the same with a hydraulic valve located within a plunger which is adapted to produce the higher pressure by means of actuation from the pressure fluid operated piston. Further objects of my invention will appear from the detailed description of the same hereinafter.

While my invention is capable of embodiment in many different forms, for the purpose of illustration I have shown only one form thereof in the accompanying drawing in which:

Fig. 1 is a longitudinal section of a booster valve made in accordance with my invention;

Fig. 2 is a vertical section of the same taken on line 2—2 of Fig. 1;

Fig. 3 is a vertical section of the same taken on line 3—3 of Fig. 1; and

Fig. 4 is a vertical section of the same taken on line 4—4 of Fig. 1.

As shown in the drawing, I have provided a hydraulic intensifier mechanism 1 which may be mounted in any desired position on an apparatus, such, for instance, as a wheel brake motor mechanism 1a, in which a further pressure is to be increased by the operation thereof. For this purpose, for example, there may be provided a flexible inlet pipe 2 carrying a fluid pressure medium, as for example a hydraulic liquid received, for instance, from a master cylinder 2a, the pressure of which is to be increased by the booster mechanism 1 so as to be delivered therefrom by a flexible outlet pipe 3. Accordingly, the high pressure liquid is received from the pipe 2 in an inlet 4 located in a screw-plug 5 which is screw-threaded into a cap 6 screw-threaded on to a valve casing 7. Within the cap 6 there is a baffle plate 8 having notches 9 around the margin thereof, said baffle 8 being located in a recess 10 between the screw plug 5 and the cap 6.

Below the recess 10 there is a further annular recess 11 which receives a hollow inlet plunger 12 having at its right hand end a valve head 13 provided with a tapering valve seat 14 adjacent to a recess 15 forming a liquid compensation valve allowing the liquid to pass through the valve 13, 14 in either direction when open. Opposite the said recess 15 there is a valve sleeve 16 having an annular seal 17. The said sleeve 16 has longitudinal slots 18 at its rear end and at its forward end is adapted to contact with an annular stop 19 where its end cooperates with a split ring stop 20 located in a recess in the hollow plunger 12. The said slots 18 are adapted to convey the liquid initially from the opening 4 through the recess 10, recess 15 and slots 18, to an annular chamber 21 around the valve plunger 12 and thence to a port 23 to an outlet opening 24 which leads to the pipe 3 and thence to the brakes or any other part to be moved.

Furthermore, the said outlet opening 24 has an angular passageway 25 in a plunger casing 26 fastened to the valve casing 7 by screws 27. The said passageway 25 leads to a cylindrical chamber 28 in said plunger casing 26. The plunger casing 26, furthermore, has therein a hollow plunger 29 sliding in said chamber 28 provided with an annular outside seal 30. At its forward end the said plunger 29 cooperates with a rear end 31 of the plunger 12, the said end 31 normally leaving an interval between serrations 32 on the end 31 of the plunger 12 to permit the passage of fluid. Near this rear end 31 of the valve plunger 12 there is, furthermore, an annular seal 33 located in the valve casing 7. On the inside said valve plunger 12 has a split ring 34 located in a recess in the plunger 12 to act as a limiting stop in the movement of a circular plate 35 having a flat central projection 36 thereon to act as a valve seat in cooperation with a tubular valve 37 carried in the plunger 29. The tubular valve 37 has a longitudinal passageway 38 and extends forwardly through an annular seal 39 in the plunger 29 so as to provide at its forward end a narrow flat valve surface 40 which is adjacent to a beveled surface 41. The said valve surface 40, in cooperation with the flat valve surface 36, forms a valve which is normally pressed open by a spring 42 located between the plunger 29 and the plate 35. The said valve is seated by the movement of the valve plunger 12 through the action of a plate 43 having a central cylindrical recess 44 to receive a ball 45 which is supported in a recess 46 in the projection 36. The ball 45 spaces the plates 43 and 35 slightly apart so as to enable the valve seat 36 to become accurately accommodated to the valve surface 40 on the tubular valve 37.

The rear end of the plunger 29 passes through an annular seal 47 in the plunger casing 26 and has an inwardly directed annular projection 48 which cooperates with an annular projection 49 on the outside of the tubular valve 37, thus forming a chamber 50, at the forward end of which the tubular valve 37 has a shoulder 51 which balances any fluid pressures against the forward side of the annular projection 49. Furthermore, the said annular projection 48 on the plunger 29 carries within the same a plurality of radial ports 52 communicating with an annular recess 53 in the inside of the plunger casing 26. This recess 53 in turn communicates with a port 54 which leads to an inlet opening 55 connected by a pipe 56 to any desired source of fluid pressure, as for example compressed air, hydraulic pressure fluid, etc. The said passageways 52 communicate at their inner ends with a recess 57 on the outside of the tubular valve 37, adjacent to which there is a tapered valve surface 58, on the rear end of the tubular valve 37, which co-operates with a valve seat 59 located on the plunger 29. The tapered valve surface 58 is located on an annular projection 60 on the tubular valve 37 so as to act as a support for a helical spring 61, the rear end of which is supported against a flange 62 which is screw-threaded so as to be capable of adjustment within a screw-thread 63 in the interior of the plunger 29. The flange 62 is carried by an adjustable plunger rod 64 having a sealing flange 65 provided with an annular seal 66, sliding within the plunger 29. A split ring stop 67 is also carried in the plunger 29, a recess therein being provided for this purpose. The spring 61 is located in a chamber 68 which is connected with the chamber 70 by a port 69 in the plunger 29 and which has adjacent to the chamber 70 an annular seal 72 in the casing 26. Within the chamber 70 there is located a piston 73 having an annular seal 74.

This piston 73 rests against a stop 75 at one side thereof and is provided with an annular seal 76 on the other side thereof cooperating with a ring 77 screw-threaded on the outside of the plunger 29. Screw-threaded on the outside of the enlargement 71 there is a spring housing 78 containing a spring 79, one end of which is supported on the spring housing 78 and the other end of which forces the piston 73 normally to the right. In the rear of the spring housing 78 there is a circular opening 80 which receives a rotatable thumb screw 81 having a square opening 82 through the same to receive a square end 83 of the rod 64. By turning the thumb screw 81 the position of the screw-threaded flange 82 can be altered to adjust the compression of the spring 61. An outlet opening 84, for compressed air, etc., is located in the plunger casing 26 which communicates with an annular groove 85 leading to a series of ports 86. These ports 86 communicate with an annular chamber 87 which in turn communicate with the slots formed by the serrations 32.

In the operation of the apparatus made in accordance with my invention, when, for example, a hydraulic liquid under manual or any other pressure is supplied through the inlet pipe 2 the hydraulic liquid passes into the opening 4 around the edge of the baffle plate 11 and around the edge of the valve 14 through the chamber 15, the slots 18, into the chamber 21, through the port 27 and outlet 24 to the pipe 3, filling the passageway 25 and the chamber 28. When pressure is applied to the liquid in the pipe 2 this pressure substantially immediately closes the valve 14 by moving it against the valve sleeve 16 so as to close said valve 14 and move the valve plunger 12 rearwardly, carrying with it the valve sleeve 16. The valve 14, 16 will remain closed during the operation of the plunger 12 owing to the larger area on the right-hand end of the plunger 12 notwithstanding the intensified pressure in the annular chamber 21 as compared with the pressure at the right-hand end of the valve head 13. This carries the liquid forwardly in the pipe 3, and, simultaneously, this movement of the valve plunger 12 will close the valve 40, 36 on the tubular valve member 37 and open the valve 58, 59. Prior to the opening of the valve 58, 59 the liquid in the pipe 3 is under manual operation. The opening of the valve 58, 59 admits the pressure fluid, as for example compressed air from the pipe 56, to the chamber 68 and thence to the chamber 70 which, as a result, moves the piston 73 against the force of the spring 79. This movement carries with it the plunger 29 operating in the chamber 28, said plunger 29 being smaller in diameter than the piston 73 so as to produce an intensification of the pressure in the chamber 28 as compared with the pressure admitted by the pipe 56. This increased pressure is transmitted to the liquid in the chamber 28, which is thence conveyed to the pipe 3 and from there to any desired part of an apparatus designed to be moved, as for example the brake cylinders in automotive vehicles. It will be understood that by adjusting the nut 81 the compression of the spring 61 can be adjusted so as to adjust the point of opening of the valve 58, 59. When any desired given pressure is transmitted by the pipe 56 for the operation of the brakes, etc., and no additional pressure is being applied from the pipe 2, the valves 41, 42 and 58, 59 will assume lapped position and the continued movement of the piston 73 will, accordingly, cease until some further alteration of the pressure in the pipe 2 takes place. Increased pressure from the pipe 2 will move the piston 73 towards the left, in Fig. 1, and decreased pressure in the pipe 2 will result in moving the piston 73 to the right in said figure. When decreased pressure is received from the pipe 2, this will tend to unseat the valve 41, 42, thus releasing some of the air pressure through the discharge pipe 84.

In the off-modulation the valve 14 will be returned to open position by the spring 42, to allow liquid compensation, and the valve 36, 40 will return to open position, allowing the pressure fluid which was received by the pipe 56 to pass out though the discharge or vent pipe 84. Also, the valve 58, 59 will be restored to closed position. The movement of the parts of the booster valve in operation will thus operate by on-modulation or off-modulation to supply modulated pressure liquid at a much higher pressure from the booster valve than in the case of the liquid received for the latter. In this way modulated pressures in any desired amount can be obtained for the operation of the brakes or any other part to be moved.

While I have described my invention above in detail I wish it to be understood that many changes may be made therein without departing from the spirit of the same.

I claim:

1. A fluid pressure apparatus comprising a pressure fluid inlet, a fluid compensating valve including a plunger for receiving the fluid from said inlet, a cylinder into one end of which said plunger extends having a communication adapted to receive the said fluid from said inlet, a piston in said cylinder for placing additonal pressure on said fluid, an inlet for another fluid under a pressure greater than the atmospheric pressure, a valve means, having an inlet valve and an outlet valve located within said piston, for controlling the inlet and exhaust of said other fluid by means of said valve plunger, and a cylinder into which said other fluid is admitted containing a second piston extending into the other end of said first mentioned cylinder and connected to said first mentioned piston and subjected to the pressure of said other fluid for moving the first mentioned piston in said chamber.

2. A fluid pressure apparatus comprising a pressure fluid inlet, a fluid compensating valve including a plunger for receiving the fluid from said inlet, a cylinder adapted to receive the said fluid, a piston in said cylinder for placing additional pressure on said fluid, an inlet for another fluid under a pressure greater than the atmospheric pressure, a valve means, having an inlet valve and an outlet valve located within said piston, for controlling the inlet and exhaust of said other fluid by means of said valve plunger, a cylinder into which said other fluid is admitted containing a second piston connected to said first mentioned piston and subjected to the pressure of said other fluid for moving the first mentioned piston in said chamber, and a spring for normally closing said inlet valve having a manual adjusting means for the same.

3. A hydraulic apparatus comprising a hydraulic inlet, a liquid compensating valve including a plunger for receiving the liquid from said inlet, a cylinder adapted to receive the said hydraulic liquid, a piston in said cylinder for placing additional pressure on said liquid, an inlet for another fluid under a pressure greater than the atmospheric pressure, a valve means, having an inlet valve and an outlet valve located within said piston, for controlling the inlet and exhaust of said other fluid by means of said valve plunger, a cylinder into which said other fluid is admitted containing a second piston extending into the other end of said first mentioned cylinder and connected to said first mentioned piston and subjected to the pressure of said other fluid for moving the first mentioned piston in said chamber, a spring for normally closing said inlet valve having a manual adjusting means for the same, a spring for normally opening said outlet valve, and a tiltable outlet valve seat member cooperating with said spring having a ball support for the same.

4. A hydraulic apparatus comprising a hydraulic inlet, a liquid compensating valve including a plunger for receiving the liquid from said inlet, a cylinder adapted to receive the said hydraulic liquid, a piston in said cylinder for placing additional pressure on said liquid, an inlet for another fluid under a pressure greater than the atmospheric pressure, a valve means, having an inlet valve and an outlet valve located within said piston, for controlling the inlet and exhaust of said other fluid by means of said valve plunger, a cylinder into which said other fluid is admitted containing a second piston connected to said other fluid for moving the first mentioned piston in said chamber, a spring for normally closing said inlet valve having a manual adjusting means for the same, a spring for normally opening said outlet valve, a tiltable outlet valve seat member cooperating with said spring having a ball support for the same, and a recessed plate for supporting said ball, carried by said valve plunger.

5. A hydraulic apparatus comprising a hydraulic inlet, a liquid compensating valve including a plunger for receiving the liquid from said inlet, a cylinder adapted to receive the said hydraulic liquid, a piston in said cylinder for placing additional pressure on said liquid, an inlet for another fluid under a pressure greater than the atmospheric pressure, a valve means, having an inlet valve and an outlet valve located within said piston, for controlling the inlet and exhaust of said other fluid by means of said valve plunger, a cylinder into which said other fluid is admitted containing a second piston connected to said first mentioned piston and subjected to the pressure of said other fluid for moving the first mentioned piston in said chamber, a spring for normally closing said inlet valve having a manual adjusting means for the same, said spring being located within said second piston, a retracting spring for said second piston, and a housing for said last mentioned spring through which the manual adjusting means extends.

6. A hydraulic apparatus comprising a hydraulic inlet, a liquid compensating valve including a plunger for receiving the liquid from said inlet, a cylinder into one end of which said plunger extends having a communication adapted to receive the said hydraulic liquid from said inlet, a piston in said cylinder for placing additional pressure on said liquid, an inlet for another fluid under a pressure greater than the atmospheric pressure, a valve means, having an inlet valve and an outlet valve located within said piston, for controlling the inlet and exhaust of said other fluid by means of said valve plunger, and a motor having a movable member extending into the other end of said first mentioned cylinder and connected to said piston so as to abut against said plunger and subjected to a pressure derived from said other fluid for moving the piston in said chamber.

7. An apparatus comprising an inlet for a fluid under pressure, an inlet for a fluid to be placed under pressure, a power intensifier having a large piston for receiving the first mentioned fluid under pressure and a power intensifying piston connected thereto for placing the second mentioned fluid under pressure, a plunger valve in said intensifier having inlet and outlet valve elements for said fluid under pressure, said plunger valve being subject to control by the incoming fluid to be placed under pressure, and manual means located outside the apparatus for adjusting the opening point of said inlet valve.

8. An apparatus comprising an inlet for a fluid under pressure, an inlet for a fluid to be placed under pressure, a power intensifier having a large piston for receiving the first mentioned fluid under pressure and a power intensifying piston connected thereto for placing the second mentioned fluid under pressure, a spring supported plunger valve in said intensifier having inlet and outlet valve elements for said fluid under pressure, said plunger valve being subject to control by the incoming fluid to be placed under pressure, and manual means located outside the apparatus for adjusting the tension of said spring for the opening point of said inlet valve.

9. An apparatus comprising an inlet chamber for fluid under pressure, an inlet for fluid to be placed under pressure, a power intensifier comprising a large piston, having a cylinder, and a smaller piston, having a cylinder, said chamber being located between said cylinders and said cylinders being provided with communications adapted to receive said two fluids, respectively, and a valve plunger in the said power intensifier for controlling the entrance and exit of the first mentioned fluid.

10. An apparatus comprising an inlet chamber for fluid under pressure, an inlet for fluid to be placed under pressure, a power intensifier comprising a large piston, having a cylinder, and a smaller piston, having a cylinder, said chamber being located between said cylinders and said cylinders being provided with communications adapted to receive said two fluids, respectively, and a valve plunger in the said power intensifier for controlling the entrance and exit of the first mentioned fluid, said valve plunger having inlet and outlet valve elements and a valve closing member for the outlet valve operated by said second mentioned fluid.

11. An apparatus comprising an inlet chamber for fluid under pressure, an inlet for fluid to be placed under pressure, a power intensifier comprising a large piston, having a cylinder, and a smaller piston, having a cylinder, said chamber being located between said cylinders and said cylinders being provided with communications adapted to receive said two fluids, respectively, and a valve plunger in alignment within the said power intensifier for controlling the entrance and exit of the first mentioned fluid.

12. An apparatus comprising an inlet chamber for fluid under pressure, an inlet for fluid to be placed under pressure, a power intensifier comprising a large piston, having a cylinder, and a smaller piston, having a cylinder, said chamber being located between said cylinders and said cylinders being provided with communications adapted to receive said two fluids, respectively, and a valve plunger in alignment within the said intensifier for controlling the entrance and exit of the first mentioned fluid, said valve plunger having inlet and outlet valve elements and a valve closing member for the outlet valve operated by said second mentioned fluid.

13. A fluid pressure apparatus comprising an inlet for pressure fluid, a plunger valve having inlet and outlet valve elements for said pressure fluid, a movable member for cooperating with said plunger to close the outlet valve and open the inlet valve, fluid pressure means for moving said member including an inlet plunger, a cylinder for said plunger, a pressure-increasing plunger and cylinder associated with the plunger valve which is within the pressure-increasing plunger and located in alignment with the inlet plunger, said two cylinders having a communication between them, and means for applying pressure to the pressure-increasing plunger, located on the other side of the last mentioned cylinder from the location of the inlet cylinder.

14. A hydraulic apparatus comprising an inlet for pressure fluid, a plunger valve having inlet and outlet valve elements for said pressure fluid, a movable member for cooperating with said plunger to close the outlet valve and open the inlet valve, hydraulic means for moving said member including an inlet plunger, a cylinder for said plunger, a pressure-increasing plunger and cylinder associated with the plunger valve which is within the pressure-increasing plunger and located in alignment with the inlet plunger, said two cylinders having a communication between them, means for applying pressure to the pressure-increasing plunger located on the other side of the last mentioned cylinder from the location of the inlet cylinder, and a liquid compensation valve in said communication associated with said inlet.

15. A fluid pressure apparatus comprising an inlet for pressure fluid, a plunger valve having inlet and outlet valve elements for said pressure fluid, a movable member for cooperating with said plunger to close the outlet valve and open the inlet valve, fluid pressure means for moving said member including an inlet plunger, a cylinder for said plunger, a pressure-increasing plunger and cylinder in alignment with the plunger valve which is within the pressure-increasing plunger and located in alignment with the inlet plunger, said two cylinders having a communication between them, and means for applying pressure to the pressure-increasing plunger, located on the other side of the last mentioned cylinder from the location of the inlet cylinder.

16. A hydraulic apparatus comprising an inlet for pressure fluid, a plunger valve having inlet and outlet valve elements for said pressure fluid, a movable member for cooperating with said plunger to close the outlet valve and open the inlet valve, hydraulic means for moving said member including an inlet plunger, a cylinder for said plunger, a pressure-increasing plunger and cylinder in alignment with the plunger valve which is within the pressure-increasing plunger and located in alignment with the inlet plunger, said two cylinders having a communication between them, means for applying pressure to the pressure-increasing plunger, located on the other side of the last mentioned cylinder from the location of the inlet cylinder, and a liquid compensation valve in said communication associated with said inlet.

EDWARD A. ROCKWELL.

REFERENCES CITED

The following references are of record in the file of this patent:

UNITED STATES PATENTS

| Number | Name | Date |
|---|---|---|
| 2,260,491 | Stelzer | Oct. 28, 1941 |
| 2,265,817 | Rockwell | Dec. 9, 1941 |
| 2,275,697 | Stelzer | Mar. 10, 1942 |
| 2,306,346 | Rockwell | Dec. 22, 1942 |
| 2,322,063 | Schnell | June 15, 1943 |
| 2,399,270 | Vickers | Apr. 30, 1946 |
| 2,440,654 | Elliott | Apr. 27, 1948 |